US010717256B2

(12) United States Patent
Mouser et al.

(10) Patent No.: US 10,717,256 B2
(45) Date of Patent: Jul. 21, 2020

(54) BI-LAMINATE POLYMER COATED METAL SUBSTRATE, VEHICLE TRIM MEMBER FORMED THEREFROM, AND METHODS OF MANUFACTURE THEREOF

(71) Applicant: MAGNA EXTERIORS INC., Aurora (CA)

(72) Inventors: Scott Mouser, Brampton (CA); Malcolm Ward, Innisfil (CA); Monica Saarlaid, Aurora (CA); Robyn Griffin, Barrie (CA)

(73) Assignee: MAGNA EXTERIORS INC., Aurora (CA)

(*) Notice: Subject to any disclaimer, the term of this patent is extended or adjusted under 35 U.S.C. 154(b) by 188 days.

(21) Appl. No.: 15/672,681

(22) Filed: Aug. 9, 2017

(65) Prior Publication Data

US 2018/0043673 A1 Feb. 15, 2018

Related U.S. Application Data

(60) Provisional application No. 62/373,113, filed on Aug. 10, 2016.

(51) Int. Cl.
*B32B 37/12* (2006.01)
*B32B 37/15* (2006.01)
(Continued)

(52) U.S. Cl.
CPC ............. *B32B 37/12* (2013.01); *B32B 37/15* (2013.01); *B60J 10/16* (2016.02); *B60J 10/265* (2016.02);
(Continued)

(58) Field of Classification Search
CPC ................ B32B 7/06; B60R 13/043; B60R 13/04–13/046; F16B 5/12–5/128
See application file for complete search history.

(56) References Cited

U.S. PATENT DOCUMENTS 4,437,916 A * 3/1984 Adell .................... B60R 13/043
156/201
4,679,290 A * 7/1987 Adell .................... B60R 13/043
29/407.09
(Continued)

FOREIGN PATENT DOCUMENTS

CA 2110280 A1 10/1993

OTHER PUBLICATIONS

"Product Information—Kynar® Laminated Jacketing", https://www.idealproducts.ca/Portals/0/Documents/data-sheets/Kynar-Laminated-Jacketing.pdf.

*Primary Examiner* — Ramsey Zacharia
(74) *Attorney, Agent, or Firm* — Dickinson Wright PLLC

(57) ABSTRACT

A bi-laminate polymer coated metal substrate, vehicle trim member formed therefrom, and method of manufacture thereof are provided. The bi-laminate polymer coated metal substrate includes a monolithic metal substrate having a first area with a first polymeric material bonded thereto and a second area, different from the first area, with a second polymeric material bonded thereto. A substantially tear resistant, protective substrate is releasably bonded to the first polymeric material, with the first polymeric material being sandwiched between the protective substrate and the metal substrate. The protective substrate is selectively removable from the first polymeric material to expose the first polymeric material as a finish surface.

8 Claims, 5 Drawing Sheets

(51) Int. Cl.
*B60R 13/04* (2006.01)
*B60J 10/16* (2016.01)
*B60J 10/265* (2016.01)
*B60J 10/75* (2016.01)

(52) U.S. Cl.
CPC ............... *B60J 10/75* (2016.02); *B60R 13/04* (2013.01); *B32B 2605/00* (2013.01)

(56) References Cited

U.S. PATENT DOCUMENTS

| | | | | |
|---|---|---|---|---|
| 4,753,041 A | * | 6/1988 | Adell | ................... B60R 13/043 29/469.5 |
| 5,182,141 A | | 1/1993 | Borys et al. | |
| 2003/0031891 A1 | | 2/2003 | Fields | |
| 2011/0052880 A1 | * | 3/2011 | Iizuka | ...................... B32B 3/30 428/172 |

* cited by examiner

BI-LAMINATE POLYMER COATED METAL SUBSTRATE, VEHICLE TRIM MEMBER FORMED THEREFROM, AND METHODS OF MANUFACTURE THEREOF

CROSS-REFERENCE TO RELATED APPLICATION

This application claims the benefit of U.S. Provisional Application Ser. No. 62/373,113, filed Aug. 10, 2016, which is incorporated herein by reference in its entirety.

FIELD OF THE DISCLOSURE

The present disclosure relates generally to laminated metal substrates, and more particularly to metal substrates with polymeric materials laminated therewith.

BACKGROUND OF THE DISCLOSURE

This section provides background information which is not necessarily prior art to the inventive concepts associated with the present disclosure.

Polymer coated metals are known. Their desirability stems largely from the combination of the advantages of a core metal substrate with those of an outer polymer coating. In the automobile industry, for example, the characteristics of a resilient, conformable metal, such as aluminum or steel, are often desirable for trim members. Some polymer coatings, while permitting the metal substrate to retain these desirable characteristics, may facilitate resistance of the metal substrate to degradation from environmental elements, including extreme temperature fluctuations, and can further act as a sealant interface, such as between a window and an adjacent support frame. In addition, some polymer coatings are further intended to render exposed portions of the trim member as being visually appealing.

One known approach taken, in the automobile industry, to manufacture a trim member with materials and characteristics discussed above has been to produce two separate metal strips, one partially coated with a first polymeric material suitable to achieve a first set of desired attributes and the other partially coated with a second polymeric material, different from the first polymeric material, suitable to achieve a second set of desired attributes. The separate strips are then fixed together with the first polymeric material being visually exposed to provide an aesthetically pleasing finish surface and the second polymeric material being concealed to function as a visually unexposed sealant. Although the trim member attained from such manufacture can result in attributes desired, it is labor intensive and costly in manufacture.

The present disclosure addresses these issues, along with others, as will be readily appreciated by one possessing ordinary skill in the art upon viewing the entirety of the disclosure herein.

SUMMARY OF THE DISCLOSURE

The present disclosure provides a bi-laminate polymer coated metal substrate and method of manufacture thereof. The bi-laminate polymer coated metal substrate includes a monolithic metal substrate having a first area and a second area. A first polymeric material has a first side bonded to the first area and an opposite second side facing away from the first side. A second polymeric material is bonded to the second area. A protective substrate is releasably bonded to the second side of the first polymeric material. The first polymeric material is sandwiched between the protective substrate and the metal substrate, wherein the protective substrate is selectively removable from the second side of the first polymeric material to present the second side as an exposed finish surface.

In accordance with another aspect of the disclosure, the first and second polymeric materials are spaced from one another by a gap.

In accordance with another aspect of the disclosure, the bi-laminate polymer coated metal substrate can take the form of a non-planar vehicle trim member.

In accordance with another aspect of the disclosure, the first polymeric material can be provided as a thermoplastic material and the second polymeric material can be provided as a thermoset material.

In accordance with another aspect of the disclosure, the second polymeric material can be provided as a resilient, elastomeric material.

In accordance with another aspect of the disclosure, the first polymeric material can be provided as a thermoplastic fluoropolymer.

In accordance with another aspect of the disclosure, the second side of the first polymeric material abuts and conforms with a forming surface of the protective substrate, wherein at least a portion of the forming surface of the protective substrate can be provided with a non-smooth design, pattern, texture and/or appearance, thereby transferring the non-smooth design, pattern, texture and/or appearance directly onto an abutting region of the of the second side of the first polymeric material in an economical, reliable manner. Accordingly, upon removal of the protective substrate, the desired finish surface is automatically provided without need for secondary operations.

In accordance with another aspect of the disclosure, the entirety of the forming surface of the protective substrate can be provided with a non-smooth design, pattern, texture and/or appearance, thereby providing the same non-smooth design, pattern, texture and/or appearance on the finish surface of the first polymeric material in an economical, reliable manner.

In accordance with another aspect of the disclosure, a first portion of each the forming surface and the finish surface can be provided with a first surface finish and a second portion of each the forming surface and the finish surface can be provided with a second surface finish, wherein the first and second surface finishes are different from one another.

In accordance with another aspect of the disclosure, a first portion of each the forming surface and the finish surface can be provided with a non-smooth surface finish and a second portion of each the forming surface and the finish surface can be provided with a smooth surface finish.

In accordance with another aspect of the disclosure, the second polymeric material can be extruded to finish shape directly onto the second surface, thereby doing away with the need for any secondary operations on the second polymeric material, thereby reducing cost and reducing the potential for damage to the remaining regions of the bi-laminate polymer coated metal substrate.

In accordance with another aspect of the disclosure, the protective substrate can be provided as an impervious sheet of material.

In accordance with another aspect of the disclosure, the protective substrate can be provided as a sheet of polyethylene terephthalate (PET).

In accordance with another aspect of the disclosure, a first adhesive can be provided to facilitate bonding between the first polymeric material and the metal substrate.

In accordance with another aspect of the disclosure, the first adhesive can be cured in advance of bonding the first polymeric material thereto, wherein residual heat from the curing facilitates bonding the first polymeric material to the metal substrate.

In accordance with another aspect of the disclosure, a second adhesive can be provided to facilitate bonding between the second polymeric material and the metal substrate.

In accordance with another aspect of the disclosure, a method of manufacture of a bi-laminate polymer coated metal substrate includes, providing a metal substrate; bonding a laminate, including a finish surface material laminated with a protective substrate, to a first area of the metal substrate, and bonding a resilient elastomeric material on a second area of the metal substrate.

In accordance with another aspect of the disclosure, the method can further include extruding the resilient, elastomeric material onto the second area of the metal substrate.

In accordance with another aspect of the disclosure, the method can further include forming the metal substrate into a substantially finished shape prior to bonding the laminate thereto.

In accordance with another aspect of the disclosure, the method can further include forming the metal substrate into a substantially finished shape prior to extruding the resilient, elastomeric material thereon.

In accordance with another aspect of the disclosure, the method can further include removing the protective substrate from the laminate after finishing manufacture of the bi-laminate polymer coated metal substrate to reveal a finish surface of the underlying first polymeric material.

In accordance with another aspect of the invention, the method can include imparting a surface texture and/or pattern on the finish surface of the first polymeric material with a forming surface of the protective substrate, whereby the surface texture and/or pattern of the forming surface automatically transfers the same surface texture and/or pattern to the finish surface, thus, doing away with the need for secondary operations to create the desired finish surface on a visually viewable region of the first polymeric material.

In accordance with another aspect of the disclosure, the method can further include forming the bi-laminate polymer coated metal substrate as a vehicle trim member, wherein the first polymeric material forms a visually exposed, and thus, readily viewable region of the vehicle trim member.

In accordance with another aspect of the disclosure, the method can further include bonding the first laminate to the first area of the metal substrate prior to extruding the resilient, elastomeric material on the second area of the metal substrate.

In accordance with another aspect of the disclosure, the method can further include extruding the resilient, elastomeric material on the second area of the metal substrate prior to bonding the laminate to the first area of the metal substrate.

In accordance with another aspect of the disclosure, the method can further include bonding the first laminate to the metal substrate and extruding the resilient, elastomeric material onto the metal substrate in spaced relation with one another.

In accordance with another aspect of the disclosure, the method can further include providing the first laminate, prior to being bonded to the metal substrate, as a lamination of a tear-resistance substrate and a thermoplastic fluoropolymer.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and other features, benefits and advantages of the present disclosure will become more readily appreciated as the same becomes better understood by reference to the following detailed description, appended claims and accompanying drawings, wherein:

DETAILED DESCRIPTION OF THE DISCLOSURE

Figure 1:
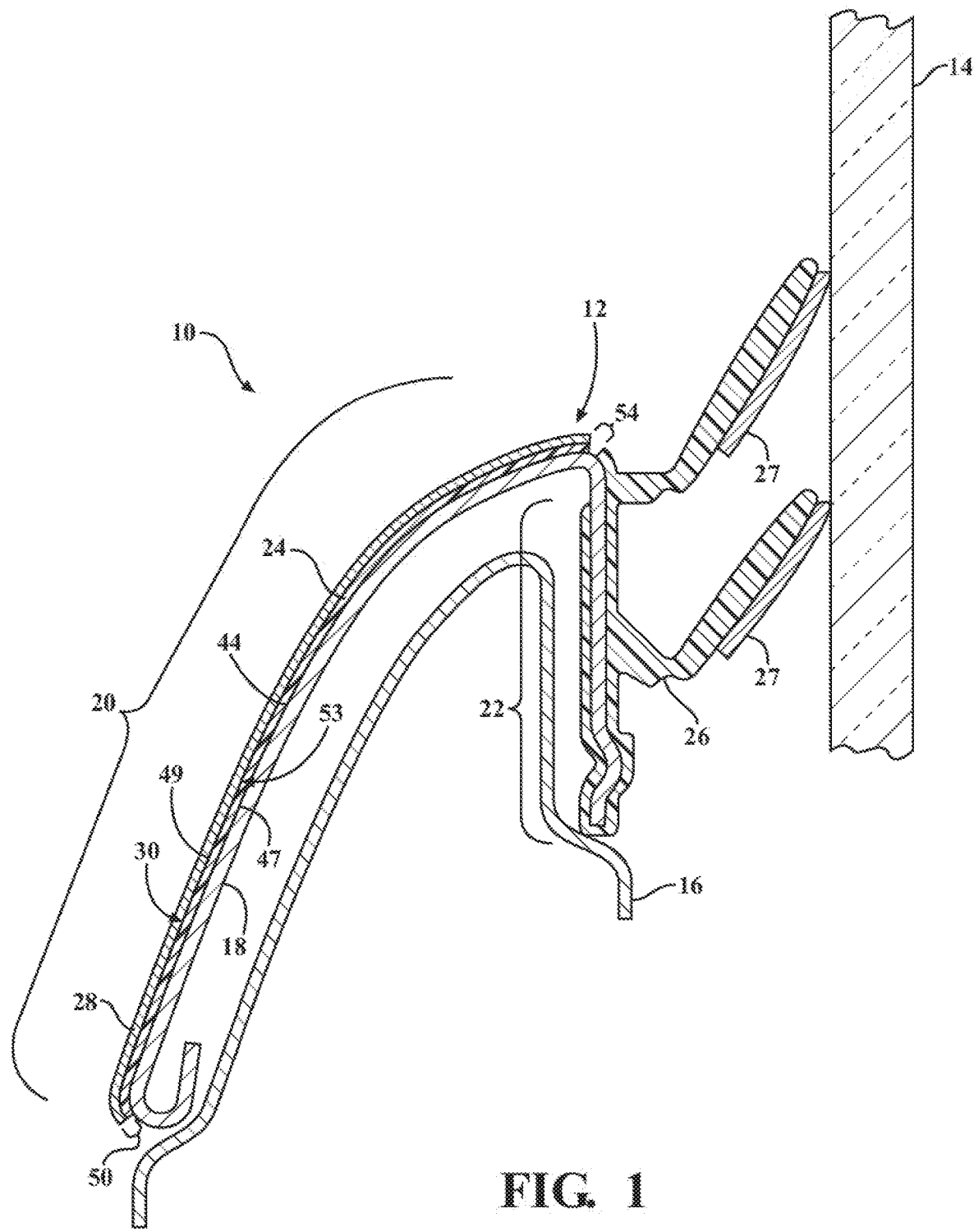
FIG. 1 is cross-sectional view of a bi-laminate metal substrate, shown configured as a vehicle trim member, in accordance with one aspect of the disclosure.

For purposes of descriptive clarity, the present disclosure is described herein in the context of one or more specific vehicular applications, namely vehicle trim members, by way of example and without limitation. Upon reading the following detailed description, in conjunction with the appended drawings and claims, it will be clear that the inventive aspects of the present disclosure can be applied to other systems and applications including polymeric coated metal substrates. "Coated", as used herein, is intended to include liquid polymeric materials applied and solidified to the metal substrate, solid polymeric materials bonded to the metal substrate, such as a sheet or sheets of solid polymeric material, by way of example and without limitation, polymeric materials sprayed onto the metal substrate, and the like, all by way of example and without limitation. A bi-laminate polymer coated metal substrate manufactured in accordance with the disclosure provides a trim member having a mar-resistant finish surface in one coated area of the trim member, wherein finish surface, as used herein, is intended to include a surface of a vehicle that is openly exposed and viewable in ordinary use, and a separate sealing feature in another coated area of the trim member, such that the separate areas of the trim member are multifunctional, sustain a long and useful life, while being economical in manufacture. These and other aspects of a bi-laminate polymer coated metal substrate manufactured in accordance with the disclosure will become readily apparent to one possessing ordinary skill in the art of coated vehicle trim members upon viewing the disclosure herein.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "compromises," "comprising," "including," and "having," are inclusive and therefore specify the presence of stated features, integers, steps, operations, elements, and/or components, but do not preclude the presence or addition of one or more other features, integers, steps operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," "bonded to," "fixed to," "attached to," or "coupled to" another element or layer, it may be directly on, engaged, connected or coupled to the other element or layer, or intervening elements or layers may be present. In contrast, when an element is referred to as being "directly on," directly engaged to," "directly connected to," "directly bonded to," "directly fixed to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below, as would be recognized through use of common sense. The device may be otherwise oriented (rotated 90 degrees or at other orientations) and the spatially relative descriptors used herein interpreted accordingly.

Figure 1A:
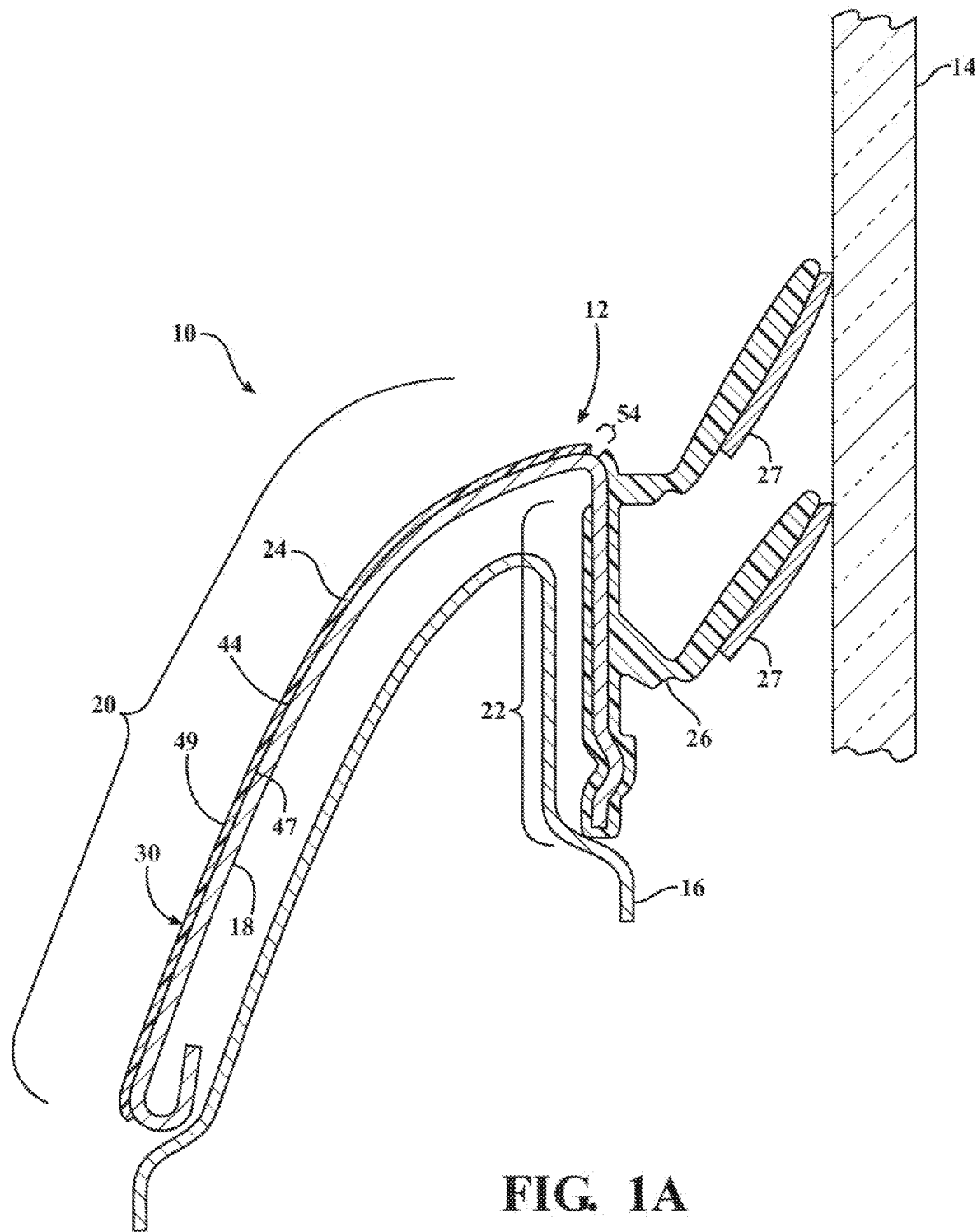
FIG. 1A is a view similar to FIG. 1 with a protective substrate removed to reveal a finish surface of the bi-laminate metal substrate.
Figure 4:
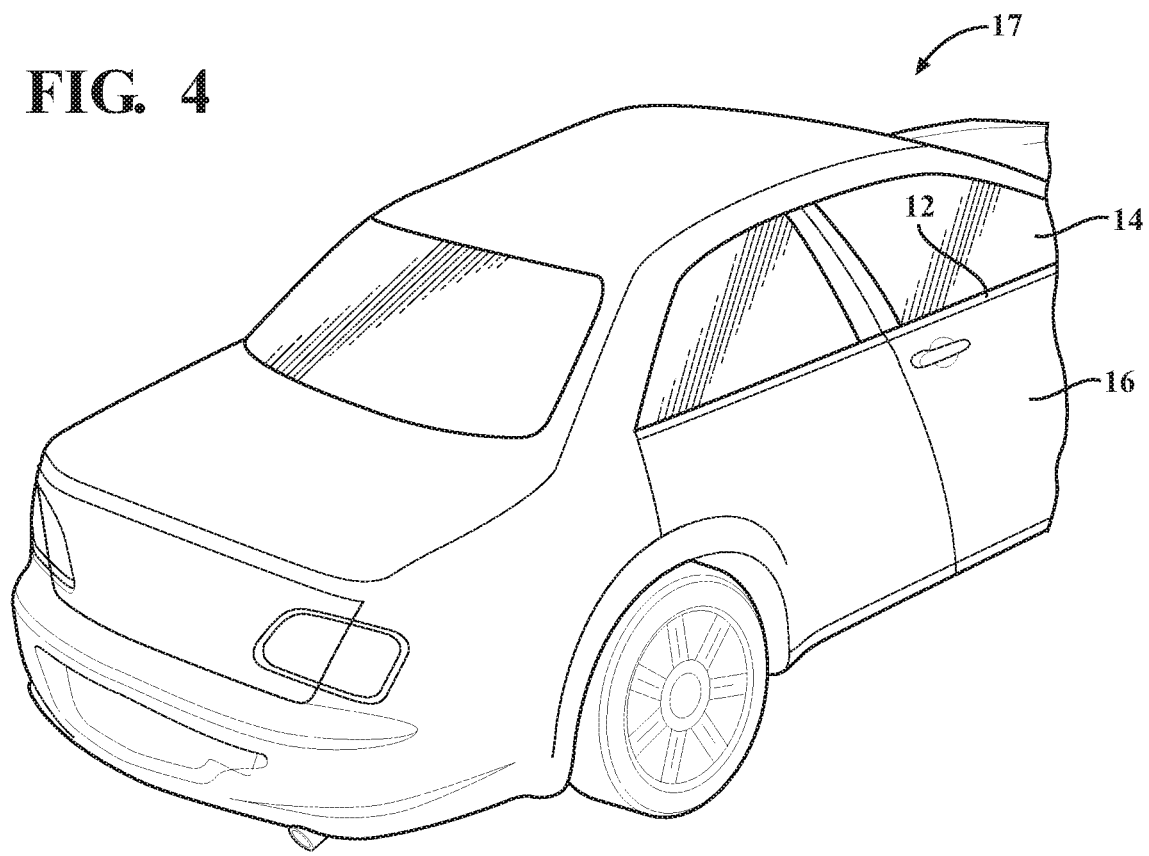
FIG. 4 is a perspective view of a vehicle having a bi-laminate vehicle trim member manufactured in accordance with another aspect of the disclosure.

Now, referring in more detail to the drawings, in accordance with one aspect of the disclosure, a bi-laminate coated metal substrate 10 is provided, wherein the coated metal substrate 10 is shown formed into a vehicle trim member 12, such as that used in an interface between a vehicle window 14 and door portion 16 of a vehicle 17 (FIG. 4), by way of example and without limitation. In the embodiment illustrated, it is to be recognized that the vehicle trim member 12 can be fastened to the door portion via any suitable fastening mechanism, such as by clips, not shown, but which are known in the art of vehicle trim applications. It is to be further recognized that the coated metal substrate 10 could be formed to take on a shape other than as shown, depending on the intended application, whether vehicle related or otherwise, such as appliance application, for example. The bi-laminate polymer coated metal substrate 10 includes a monolithic metal substrate 18, such as made from a single piece of aluminum, stainless steel, or other desired metal. The metal substrate 18 has a first area 20 and a mutually separate second area 22, shown as being on a common side of the substrate 18, wherein the first area 20 has a first polymeric material 24 bonded thereto and the second area 22 has a second polymeric material 26 bonded thereto. Further yet, in the vehicle trim application illustrated, an optional patch or patches of flock 27, or other suitable anti-friction material or coating which is preferred for use in automobile window applications, can be applied to the desired region of, in this instance, the second polymeric material 26. The flock 27 can be applied by methods known to those skilled in the art. The first polymeric material 24 is initially applied to the metal substrate 18 having a protective support substrate, also referred to simply as protective substrate 28, laminated therewith (laminated is intended to mean plied and/or layered and/or overlying, such that two or more layers are stacked on one another), wherein the protective support substrate 28 is subsequently and selectively removed therefrom to reveal an underlying finish surface 30 of the coated metal substrate 10. Accordingly, the protective substrate 28 is releasably bonded to the first polymeric material 24, such that the first polymeric material 24 is sandwiched between the protective substrate 28 and the metal substrate 18. Upon removing the protective substrate 28, the underlying finish surface 30 is revealed for direct viewing and touching, and thus, the finish surface 30 is provided being mar-resistant, tough, strong, and aesthetically pleasing (FIG. 1A shows the protective support substrate 28 removed from the first polymeric material 24).

Figure 2:
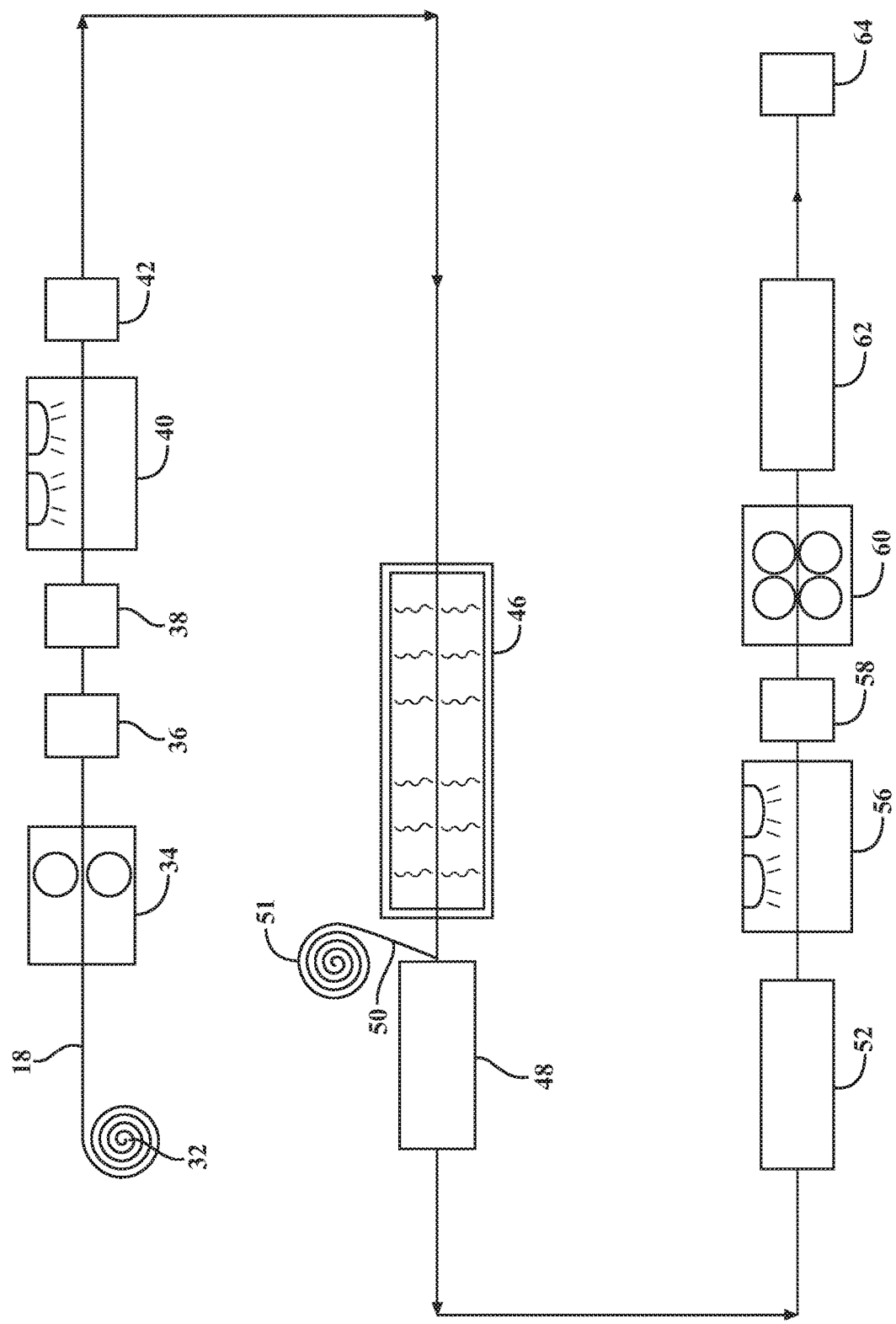
FIG. 2 is process flow diagram illustrating a process used to manufacture the bi-laminate metal substrate in accordance with another aspect of the disclosure.

In manufacture, the coated metal substrate 10 can be made via process steps illustrated in FIG. 2. Depending on the intended application, the desired type of metal substrate 18, such as aluminum or stainless steel, for example, is unwound from a spool at an uncoiling station 32. The metal substrate 18 is advanced through a roll forming station 34, wherein the metal substrate 18 is formed gradually into a non-planar finish shape by guide rollers to take on the desired finish shape, such as shown in FIGS. 1 and 1A, by way of example and without limitation. To facilitate roll forming, a lubricant can be used to inhibit scratching the surface of the substrate 18, such as water based oil, for example. Then, the formed metal substrate 18 can be sent through a straightening station 36, whereupon the formed substrate 18 is further formed to resist a phenomenon known as spring back. Further, the formed metal substrate 18 can then be sent through an air drying station 38, wherein any water based oil remaining from the upstream roll forming station 34 is dried. Next, the dried metal substrate 18 can then be sent through a cleaning station 40, such as a steam and detergent cleaning station, by way of example and without limitation. The foregoing steps are all preferably performed to facilitate bonding of the first and second materials 24, 26 to the metal substrate 18, as discussed hereafter.

Upon preparing the formed metal substrate 18, as discussed above, the substrate 18 can then be sent to a first adhesive application station 42. In the first adhesive application station 42, a suitable first adhesive 44 can be applied to the entirety of the first area 20 of the metal substrate 18. The first adhesive 44 is provided to facilitate bonding the first polymeric material 24 to the metal substrate 18. To prevent subsequent delamination, the first adhesive 44 is spread uniformly over the entirety of the first area 20 to which the first polymeric material 24 is to be subsequently applied, wherein any suitable mechanism, such as a compliant, resilient foam pad(s) or brush(es), for example, can be used to uniformly disburse and evenly spread the first adhesive 44 over the first area 20 of the metal substrate 18.

Then, upon applying an even distribution of the first adhesive 44 on the first area 20 of the metal substrate 18, the substrate 18 is forwarded to an adhesive curing, metal substrate heating station, referred to hereafter as first curing station 46. The first adhesive 44 and metal substrate 18 are sufficiently heated, at a suitable temperature and for a suitable time to both cure the first adhesive 44 and heat the metal substrate 18 for subsequent processing.

Figure 3:
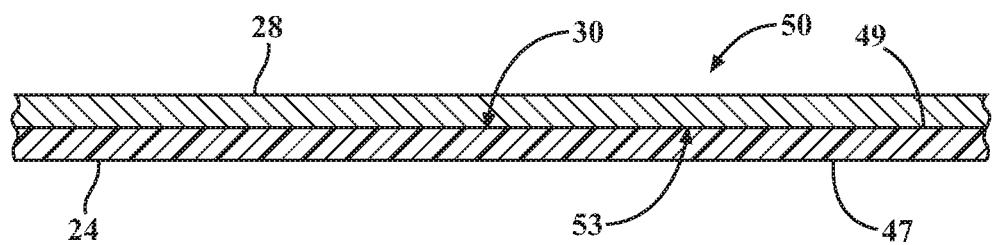
FIG. 3 is an enlarged, partial cross-sectional view of a first laminate that is bonded to the bi-laminate metal substrate of FIG. 1, with the first laminate shown prior to removal of the protective substrate therefrom.

Then, with the metal substrate 18 remaining heated from the first curing station 46, a first side 47 of the first polymeric material 24 is applied and bonded to the heated and cured first adhesive 44 and to the underlying heated metal substrate 18 at a first lamination station, also referred to as first application station 48. The first polymeric material 24 is applied to the first adhesive 44 as a selectively separable laminate 50 of the protective support substrate 28 and the first polymeric material 24 (FIG. 3). Accordingly, the protective support substrate 28 is selectively separable from, also referred to as removable or releasable, from a second side 49 of the first polymeric material 24 upon permanently bonding the first side 47 of the first polymeric material 24 to the metal substrate 18 (FIG. 1A).

The first polymeric material 24 can be provided as a uniformly distributed, evenly applied polymeric material, such as a thermoplastic material, by way of example and without limitation, and more particularly can be provided as a thermoplastic fluoropolymer, for example. One such exemplary thermoplastic fluoropolymer contemplated is a polyvinylidene difluoride (PVDF), by way of example and without limitation.

The protective support substrate 28 can be provided as a polymeric sheet, such as from an imperious sheet of polyethylene terephthalate (PET), such as Mylar, for example. Other support materials are contemplated herein for the protective support substrate 28, such as a suitably coated paper, including a releasable agent, such as polytetrafluoroethylene (PTFE) coated paper, for example. The protective support substrate 28 is provided as a flexible, tough, and preferably tear-resistant, stretch resistant layer, thereby protecting the protective support substrate 28 against damage during manufacture, such as tearing, cracking or stretching, while also facilitating the easy selective removal of the protective support substrate 28, when selectively desired.

The first polymeric material 24 can be applied to the protective substrate 28 via a spraying process, by way of example and without limitation, to initially form the laminate 50. The laminate 50 can then be disposed about a spool in roll form, by way of example and without limitation, for use at a laminate feed station 51 in the continuous process, discussed further below. If desired, any suitable adhesive can be used to facilitate forming a releasable bond between the first polymeric material 24 and the protective substrate 28, such that the protective substrate 28 can be readily removed, such as via being peeled off of the first polymeric material 24 after bonding the laminate 50 to the metal substrate 18, when desired, thereby leaving the first side of the first polymeric material 24 in permanently bonded relation to the metal substrate 18. As such, it is to be recognized that in addition to applying the first polymeric material 24 to the protective substrate 28 via a spraying process, the first polymeric material 24 could be releasably attached to the protective support substrate 28 via any other desired process, including brushing, rolling, dipping, or it could be applied as a preformed sheet thereto.

In manufacture, a roller could be used to facilitate application of a uniform wet out pressure between the first polymeric material 24 and the underlying first adhesive 44 while permanently bonding the first side 47 of the first polymeric material 24 to the metal substrate 18 via the first adhesive 44. This application of a uniform wet out pressure is facilitated by the presence of the protective substrate 28 by being able to apply a desired compressive clamping force on the protective substrate 28 without causing unwanted marking or otherwise damaging the underlying first polymeric material 24. Further yet, in addition to the protective substrate 28 functioning to protect the second side 49, which forms the finish surface 30, of the first polymeric material 24 against damage during bonding of the first polymeric layer 24 to the metal substrate 18, it further functions to prevent damage during subsequent manufacture steps and beyond. During application of the laminate 50 to the metal substrate 18, the residual heat of the metal substrate 18, from the first curing station 46, is sufficient to cause the first side 47 of the first polymeric material 24 to permanently bond with the first adhesive 44. Other mechanisms and methods for bonding the first polymeric material 24 to the metal substrate 18 could be used, including bonding with or without heat, bonding with or without adhesive, which is facilitated via the residual heat that can sufficiently cause the first polymeric material 24 to bond with the metal substrate 18, or bonding via use of an adhesive applied to the first polymeric material 24, by way of example and without limitation.

Figure 3A:
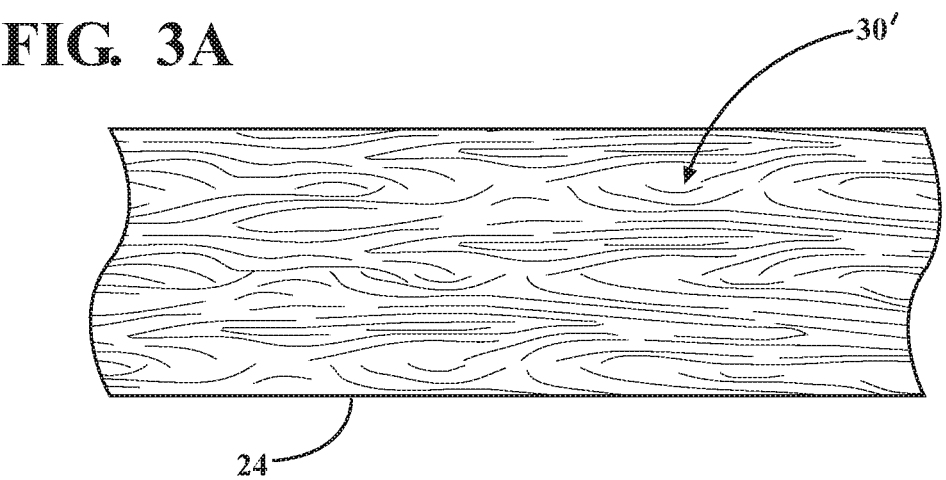
FIG. 3A is an enlarged, partial plan view showing a finish surface of a first polymeric material of the bi-laminate metal substrate in accordance with one aspect of the disclosure.
Figure 3B:
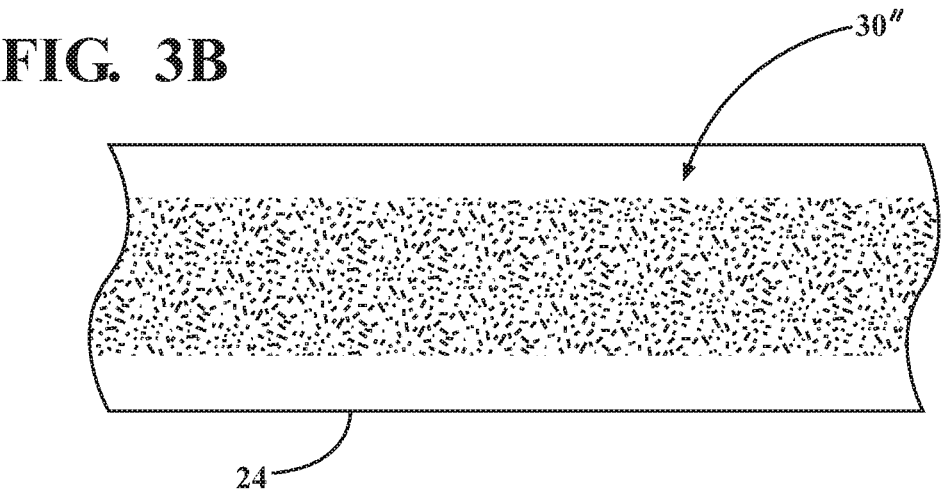
FIG. 3B is an enlarged, partial plan view showing a finish surface of the first polymeric material of the bi-laminate metal substrate in accordance with one another of the disclosure.

In accordance with a further aspect of the disclosure, the protective support substrate 28 can be provided to impart a desired smooth (intended to mean free of asperities forming peaks and valleys, thereby having what those skilled in the art would refer to as a smooth or glass-like surface finish) and/or non-smooth (intended to mean other than smooth, such as having a uniform roughened and/or non-uniform roughened, striated (such as woodgrain texture or the like), or otherwise undulating surface finish) surface finish/appearance to the finish surface 30 of the coated metal substrate 10. For example, at least a portion or the entirety of a forming surface 53 of the protective support substrate 28 to which the second side 49 of the first polymeric material 24 is applied and abuts can be provided with a desired smooth and/or non-smooth surface texture, pattern, design, and the like, such that the second side 49 of the first polymeric material 24 conforms with, and thus takes on the smooth and/or non-smooth surface finish texture, pattern, and/or design of the abutting forming surface 53 of the protective support substrate 28 desired for the resulting finish surface 30. Accordingly, upon selectively removing the protective support substrate 28 from the second side 49 of the first polymeric material 24, the finish surface 30 of the first polymeric material 24 automatically attains the desired appearance, such as a non-smooth wood grain appearance 30' (FIG. 3A, shown covering the entirety of the finish surface, by way of example and without limitation), camouflage appearance, smooth or embossed appearance, roughened or dimpled 30" (FIG. 3B, shown as a first surface finish covering a first portion of the finish surface with a smooth or substantially smooth second surface finish covering a second portion of the finish surface), and the like, which is transferred via fluidic flow and/or plastic deformation under compression against the abutting surface 53 of the protective support substrate 28. It is to be recognized that the resulting texture, pattern, and/or design can have, at least in part, an other than flat, smooth profile, thereby rendering at least a portion of the finish surface 30 having an other than flat, smooth surface, as desired, and it is to be further recognized that the finish surface 30 can be provided having any color or colors, as desired.

Upon bonding the laminate 50 to the desired area of the metal substrate 18, shown as the first area 20 in FIG. 1, the metal substrate 18, with laminate 50 bonded thereto, is transferred in-line to an extrusion station 52. At the extrusion station, the second polymeric material 26 is extruded onto the selected second area 22 of the metal substrate 18, and is preferably extruded having a finish shape (intended to mean no further processing is needed, and that the "as extruded" material 26 attains its intended in-use configuration) directly onto the second area 22. The second polymeric material 26, by way of example and without limitation, can be provided as thermoplastic vulcanite (TPV), though other thermoplastic and thermoset materials are contemplated herein. If applied as described thus far, namely, after application of the laminate 50 to the metal substrate 18, it is important that the second polymeric material 26 not require subsequent heating to a temperature that would damage the laminate 50, particularly impacting the ability to remove the protective support substrate 28 from the first polymeric material 24 or affecting the finish surface 30 of the first polymeric material 24. Accordingly, TPV is one exemplary selection for the second polymeric material 26. Otherwise, if the second polymeric material 26 is applied to the metal substrate 18 before applying the laminate 50 thereto, further options can be made available for selection of material for the second polymeric material 26, such as ethylene propylene diene monomer (EPDM), by way of example and without limitation, which requires curing at a temperature that would otherwise damage the laminate 50 if it were present. Thus, if EPDM is selected as the second polymeric material 26, it could be applied to the second area 22 and cured prior to bonding the laminate 50 to the metal substrate 18, as will be appreciated by one skilled in the art upon viewing the disclosure herein. Regardless of order of application, the first area 20, and thus, the first polymeric material 24, and the second area 22, and thus, the second polymeric material 26, do not overlap one another, thereby being referred to as being mutually separate and spaced relative to one another, thereby rendering their respective coverage areas as mutually exclusive. The spaced relation between the first and second materials 24, 26 avoids incompatibility of bonding between the first and second polymeric materials 24, 26, thereby preventing unwanted delamination or peeling of the discrete and separate materials 24, 26 from one another and from the metal substrate 18. Accordingly, in a preferred embodiment, the first and second polymeric materials 24, 26 are bonded in spaced relation from one another, and thus, are shown having at least a slight space, also referred to as gap 54, therebetween.

Then, after bonding the laminate 50 to the second area 22 of the metal substrate 18, the metal substrate 18 can be sent to a washing and cooling station 56. At the washing and cooling station 56, cold water or other suitable cold fluid or medium can be used to cool the extruded second polymeric material 26.

Then, the coated metal substrate 10 can be sent to an inspection station 58, where the substrate 10 can be inspected via any suitable inspection mechanism, including automated visual inspection equipment, by way of example and without limitation. If imperfections are found, the processed coated metal substrate 10 can either be scrapped or processed further, as desired, if correction of the uncovered defect(s) is determined to be correctable.

Then, the coated metal substrate 10 continues along to a tensioning station 60, whereupon the coated metal substrate 10 can be fed through rollers of the tensioning station 60 that maintain a select tension on the substrate 10 to advance the substrate 10, as least in part, throughout the continuous process.

Further, the coated metal substrate 10 can then be sent to a cutting station 62, whereat the coated substrate 10 is cut to the desired length and configuration. Thereafter, the finished, coated substrate 10 can be sent to a sorting station 64 and stored.

It is to be recognized that the above manufacture process is intended to be a continuous, efficient and economical process.

The foregoing description of the embodiments has been provided for purposes of illustration and description. It is not intended to be exhaustive or to limit the disclosure or claims. Individual elements or features of a particular embodiment are generally not limited to that particular embodiment, but, where applicable, are interchangeable and can be used in a different embodiment, even if not specifically shown or described. Many modifications and variations to the above embodiments, and alternate embodiments and aspects are possible in light of the above disclosure. Such variations are not to be regarded as a departure from the disclosure, and all such modifications are intended to be included within the scope of the disclosure. The modifications and variations to the above embodiments, alternate embodiments, and aspects may be practiced otherwise than as specifically described while falling within the scope of the following claims.

What is claimed is:

1. A bi-laminate polymer coated metal substrate, comprising:
   a monolithic metal substrate having a first area and a second area;
   a first polymeric material having a first side bonded to said first area and an opposite second side facing away from said first side;
   a second polymeric material bonded to said second area; and
   a protective substrate releasably bonded to said second side of said first polymeric material, said first polymeric material being sandwiched between said protective substrate and said metal substrate, wherein said protective substrate is selectively removable from said second side of said first polymeric material to present said second side as an exposed finish surface;
   wherein said second side of said first polymeric material abuts and conforms with a forming surface of said protective substrate, wherein at least a portion of said forming surface and said second side has a non-smooth surface finish, the non-smooth surface finish including a roughened or striated surface finish or appearance; and wherein a first portion of said forming surface and said finish surface has a first surface finish and a second portion of said forming surface and said finish surface has a second surface, wherein said first and second surface finishes are different from one another.

2. The bi-laminate polymer coated metal substrate of claim 1, wherein said first polymeric material and said second polymeric material are spaced from one another by a gap.

3. The bi-laminate polymer coated metal substrate of claim 1, wherein said the first polymeric material is a thermoplastic material.

4. The bi-laminate polymer coated metal substrate of claim 3, wherein said second polymeric material is a thermoset material.

5. The bi-laminate polymer coated metal substrate of claim 4, wherein said first polymeric material is a thermoplastic fluoropolymer.

6. The bi-laminate polymer coated metal substrate of claim 1, wherein the entirety of said forming surface and said finish surface has a non-smooth surface finish.

7. The bi-laminate polymer coated metal substrate of claim 1, wherein said first portion of said forming surface and said finish surface has a non-smooth surface finish and said second portion of said forming surface and said finish surface has a smooth surface finish, the smooth surface finish having a glass-like surface finish.

8. The bi-laminate polymer coated metal substrate of claim 1, wherein said second polymeric material is extruded to finish shape directly onto said second surface.

* * * * *